US008875765B2

(12) United States Patent
Tsumori et al.

(10) Patent No.: US 8,875,765 B2
(45) Date of Patent: Nov. 4, 2014

(54) RUBBER COMPOSITION FOR CLINCH APEX AND PNEUMATIC TIRE

(75) Inventors: Isamu Tsumori, Kobe (JP); Naoya Ichikawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/616,310

(22) Filed: Sep. 14, 2012

(65) Prior Publication Data

US 2013/0098523 A1 Apr. 25, 2013

(30) Foreign Application Priority Data

Oct. 25, 2011 (JP) ................................. 2011-234111

(51) Int. Cl.
| B60C 1/00 | (2006.01) |
| C08L 7/00 | (2006.01) |
| C08C 1/04 | (2006.01) |
| C08K 3/36 | (2006.01) |
| C08L 7/02 | (2006.01) |
| C08K 3/04 | (2006.01) |
| C08C 3/02 | (2006.01) |

(52) U.S. Cl.
CPC ... *C08L 7/02* (2013.01); *C08C 1/04* (2013.01); *C08K 3/36* (2013.01); *C08K 3/04* (2013.01); *Y02T 10/862* (2013.01); *C08C 3/02* (2013.01)
USPC ...................................... 152/541; 524/575.5

(58) Field of Classification Search
None
See application file for complete search history.

(56) References Cited

U.S. PATENT DOCUMENTS

| 5,017,636 | A | 5/1991 | Hattori et al. |
| 5,396,940 | A | 3/1995 | Segatta et al. |
| 5,569,740 | A | 10/1996 | Tanaka et al. |
| 6,306,955 | B1 | 10/2001 | Kawasaki et al. |
| 6,489,389 | B1 | 12/2002 | Ohta et al. |
| 7,427,646 | B2 | 9/2008 | Kondou |
| 8,163,821 | B2 | 4/2012 | Hiro |
| 8,273,804 | B2 | 9/2012 | Nishimura |
| 8,623,956 | B2 | 1/2014 | Sugimoto et al. |
| 8,633,275 | B2 | 1/2014 | Sakaki et al. |
| 8,658,728 | B2 | 2/2014 | Ichikawa et al. |
| 8,658,730 | B2 | 2/2014 | Ichikawa |
| 2004/0110889 | A1 | 6/2004 | Yagi et al. |
| 2004/0266937 | A1 | 12/2004 | Yagi et al. |
| 2005/0027060 | A1 | 2/2005 | Yagi et al. |
| 2005/0148723 | A1 | 7/2005 | Kondou |
| 2005/0234186 | A1 | 10/2005 | Kondou |
| 2006/0252879 | A1 | 11/2006 | Tanaka et al. |
| 2007/0059232 | A1 | 3/2007 | Stenzel et al. |
| 2007/0100061 | A1 | 5/2007 | Hattori et al. |
| 2008/0185087 | A1 | 8/2008 | Galimberti et al. |
| 2009/0000721 | A1 | 1/2009 | Imoto et al. |
| 2009/0088496 | A1 | 4/2009 | Miyasaka et al. |
| 2010/0206444 | A1 | 8/2010 | Kawasaki |
| 2011/0166254 | A1* | 7/2011 | Nishimura ..................... 523/155 |
| 2011/0178235 | A1* | 7/2011 | Sugimoto ................... 524/575.5 |
| 2011/0184118 | A1 | 7/2011 | Sugimoto et al. |
| 2011/0230613 | A1 | 9/2011 | Hiro |
| 2011/0253285 | A1 | 10/2011 | Ichikawa et al. |
| 2011/0294949 | A1 | 12/2011 | Sakaki et al. |
| 2013/0030083 | A1 | 1/2013 | Taguchi et al. |
| 2013/0102722 | A1 | 4/2013 | Tsumori et al. |
| 2013/0123387 | A1 | 5/2013 | Kagawa et al. |

FOREIGN PATENT DOCUMENTS

| CN | 1572825 | A | 2/2005 |
| CN | 1692128 | A | 11/2005 |
| CN | 1832967 | A | 9/2006 |
| CN | 1946744 | A | 4/2007 |
| CN | 102245644 | A | 11/2011 |
| EP | 1 484 359 | A1 | 12/2004 |
| EP | 1 568 713 | A1 | 8/2005 |
| EP | 1 652 862 | A1 | 5/2006 |
| EP | 1 816 144 | A1 | 8/2007 |
| EP | 2 154 192 | A1 | 2/2010 |
| EP | 2 377 892 | A1 | 10/2011 |
| EP | 2 476 708 | A1 | 7/2012 |
| JP | 4-356205 | A | 12/1992 |
| JP | 6-329702 | A | 11/1994 |
| JP | 06-329838 | A | 11/1994 |
| JP | 7-149955 | A | 6/1995 |
| JP | 8-12814 | A | 1/1996 |
| JP | 8-143606 | A | 6/1996 |
| JP | 11-12306 | A | 1/1999 |
| JP | 2000-344955 | A | 12/2000 |
| JP | 2001-114939 | A | 4/2001 |

(Continued)

OTHER PUBLICATIONS

Rhodia, "Rhodia Silcea launches Zeosil® Premium, a new generation of high surface-area silica offering lower resistance and greater performance," Rhodia Silica News Release, Solvay-Rhodia, Lyon, France, Feb. 27, 2007, 3 pages.

U.S. Final Rejection dated Nov. 12, 2013 for U.S. Appl. No. 13/560,090.

Final Rejection dated Sep. 13, 2013 for U.S. Appl. No. 13/672,880.

U.S. Notice of Allowance dated Aug. 28, 2013 for U.S. Appl. No. 13/013,849.

(Continued)

*Primary Examiner* — Ling Choi
*Assistant Examiner* — Catherine S Branch
(74) *Attorney, Agent, or Firm* — Birch, Stewart, Kolasch & Birch, LLP

(57) ABSTRACT

The present invention provides a rubber composition for a clinch apex which improves in fuel economy, flex crack growth resistance, and processability in a balanced manner, and also provides a pneumatic tire produced using the rubber composition. The present invention relates to a rubber composition for a clinch apex, including: a modified natural rubber having a phosphorus content of 200 ppm or less; and at least one of carbon black and a white filler.

6 Claims, No Drawings

(56) References Cited

FOREIGN PATENT DOCUMENTS

| | | |
|---|---|---|
| JP | 3294901 B2 | 6/2002 |
| JP | 2002-338734 A | 11/2002 |
| JP | 2003-94918 A | 4/2003 |
| JP | 2004-59803 A | 2/2004 |
| JP | 2004-67027 A | 3/2004 |
| JP | 2004-091715 A | 3/2004 |
| JP | 2004-182905 A | 7/2004 |
| JP | 2004-250546 A | 9/2004 |
| JP | 2004-262973 A | 9/2004 |
| JP | 2004-359773 A | 12/2004 |
| JP | 2005-41960 A | 2/2005 |
| JP | 2005-082622 A | 3/2005 |
| JP | 2005-82622 A | 3/2005 |
| JP | 2005-82766 A | 3/2005 |
| JP | 2005-126604 A | 5/2005 |
| JP | 2005-325206 A | 11/2005 |
| JP | 2006-16622 A | 1/2006 |
| JP | 2006-152045 A | 6/2006 |
| JP | 2006-152171 A | 6/2006 |
| JP | 2006-152211 A | 6/2006 |
| JP | 2006-307018 A | 11/2006 |
| JP | 2007-13173 A | 5/2007 |
| JP | 2007-145898 A | 6/2007 |
| JP | 2007-169431 A | 7/2007 |
| JP | 2008-106099 A | 5/2008 |
| JP | 2008-156446 A | 7/2008 |
| JP | 2008-214608 A | 9/2008 |
| JP | 2009-1680 A | 1/2009 |
| JP | 2009-13196 A | 1/2009 |
| JP | 2009-13197 A | 1/2009 |
| JP | 2009-191132 A | 8/2009 |
| JP | 2009-262835 A | 11/2009 |
| JP | 2010-138359 A | 6/2010 |
| JP | 2010-174169 A | 8/2010 |
| JP | 2011-153221 A | 8/2011 |
| JP | 2001-225680 A | 11/2011 |
| JP | 2011-231214 A | 11/2011 |
| WO | WO 03/082925 A1 | 10/2003 |
| WO | WO 2005/012365 A1 | 2/2005 |
| WO | WO 2010/071106 A1 | 6/2010 |

OTHER PUBLICATIONS

U.S. Notice of Allowance dated Feb. 1, 2012 for U.S. Appl. No. 13/048,914.
U.S. Notice of Allowance dated Feb. 14, 2012 for U.S. Appl. No. 12/983,338.
U.S. Notice of Allowance dated Sep. 9, 2013 for U.S. Appl. No. 13/117,182.
U.S. Office Action dated Aug. 2, 2013 for U.S. Appl. No. 13/560,090.
U.S. Office Action dated Feb. 5, 2013 for U.S. Appl. No. 13/117,182.
U.S. Office Action dated Mar. 13, 2013 for U.S. Appl. No. 13/013,849.
U.S. Office Action dated Mar. 23, 2011 for U.S. Appl. No. 12/983,338.
U.S. Office Action dated Mar. 28, 2013 for U.S. Appl. No. 13/672,880.
U.S. Office Action dated May 17, 2013 for U.S. Appl. No. 13/117,182.
U.S. Office Action dated May 9, 2013 for U.S. Appl. No. 13/006,606.
U.S. Office Action dated Oct. 10, 2012 for U.S. Appl. No. 13/006,606.
U.S. Office Action dated Sep. 15, 2011 for U.S. Appl. No. 12/983,338.
U.S. Office Action dated Sep. 19, 2011 for U.S. Appl. No. 13/048,914.
Database WPI Week 200570 Thomson Scientific, London, GB; AN 2005-684076 (XP-002673748).
International Search Report, dated Sep. 13, 2011, issued in PCT/JP2011/063248.
International Search Report, PCT/JP2009/070824, Mar. 9, 2010.
Japanese Office Action, dated Mar. 9, 2010, for Japanese Application No. 2008-318710.
Japanese Office Action, dated Mar. 9, 2010, for Japanese Application No. 2008-318711.
Japanese Office Action, dated Mar. 9, 2010, for Japanese Application No. 2009-019711.
Machine generated English translation of JP-2006-152171-A, dated Jun. 15, 2006.
Machine generated English translation of JP-2006-307018-A, dated Nov. 9, 2006.
Machine generated English translation of JP-2008-106099-A, dated May 8, 2008.
Machine generated English translation of JP-6-329702-A, dated Nov. 29, 1994.

* cited by examiner

RUBBER COMPOSITION FOR CLINCH APEX AND PNEUMATIC TIRE

TECHNICAL FIELD

The present invention relates to a rubber composition for a clinch apex, and a pneumatic tire produced using the same.

BACKGROUND ART

There has been an approach to decrease rolling resistance of a tire to suppress the heat build-up and thus improve fuel economy of a vehicle. The demand for improving fuel economy by means of tire improvement has increased in recent years. In addition to treads and sidewalls, other tire components such as clinch apexes are also required to be improved to contribute to better fuel economy (lower heat build-up).

Examples of known methods for reducing the heat build-up of rubber compositions for a clinch apex or the like include a method using semi-reinforcing filler, a method using a smaller amount of filler, and a method using silica as filler. However, such methods cause reduction in the effect of reinforcing the rubber composition, and thereby problematically cause reduction in breaking properties. Thus, it has been difficult to achieve both better fuel economy and higher breaking properties at the same time.

Meanwhile, clinch apexes are commonly produced using natural rubber. Here, natural rubber has a higher Mooney viscosity than synthetic rubbers and thus has low processability. Therefore, natural rubber to be used is usually mixed with a peptizer and masticated so that the rubber has a reduced Mooney viscosity. In the case of using natural rubber, requirement of such a process decreases productivity. Further, the mastication causes molecular chain scission in natural rubber, thereby problematically leading to a loss of the properties of a high-molecular-weight polymer that natural rubber essentially has (for example, fuel economy and rubber strength).

Patent Literature 1 discloses a rubber composition prepared using a natural rubber that has been deproteinized to reduce the total nitrogen content to 0.1% by weight or less. However, the rubber composition still has room for improving fuel economy, flex crack growth resistance, and processability in a balanced manner.

CITATION LIST

Patent Literature

Patent Literature 1: JP H06-329838 A

SUMMARY OF INVENTION

Technical Problem

The present invention aims to provide a rubber composition for a clinch apex, which solves the above problems and improves in fuel economy, flex crack growth resistance, and processability in a balanced manner. The present invention also aims to provide a pneumatic tire using the rubber composition.

Solution to Problem

The present invention relates to a rubber composition for a clinch apex which includes: a rubber component containing a modified natural rubber having a phosphorus content of 200 ppm or less; and at least one of carbon black and a white filler.

The rubber composition preferably includes 5% by mass or more of the modified natural rubber based on 100% by mass of the rubber component. The modified natural rubber preferably has a nitrogen content of 0.3% by mass or less and a gel content of 20% by mass or less, the gel content being determined as an amount of matter insoluble in toluene.

The modified natural rubber is preferably produced by saponifying natural rubber latex. The modified natural rubber is preferably produced by the steps of: (A) saponifying natural rubber latex to prepare a saponified natural rubber latex; (B) coagulating the saponified natural rubber latex and treating the resulting coagulated rubber with alkali; and (C) washing the resultant rubber until the phosphorus content in rubber falls to 200 ppm or less. The white filler is preferably silica.

The present invention also relates to a pneumatic tire including a clinch apex produced from the rubber composition.

Advantageous Effects of Invention

The rubber composition for a clinch apex of the present invention includes a rubber component containing a modified natural rubber having a phosphorus content of 200 ppm or less; and at least one of carbon black and a white filler. Thus, the fuel economy, flex crack growth resistance and processability can be improved in a balanced manner.

DESCRIPTION OF EMBODIMENTS

The rubber composition for a clinch apex of the present invention includes a rubber component containing a modified natural rubber having a phosphorus content of 200 ppm or less; and at least one of carbon black and a white filler.

The use of a modified natural rubber prepared by decreasing or removing phospholipids in natural rubber enables an improvement of fuel economy. An unvulcanized rubber composition containing the modified natural rubber is excellent in processability and thus can be kneaded sufficiently without any mastication step. Therefore, a reduction in the properties of natural rubber, such as breaking properties, caused by mastication is suppressed, and the fuel economy and flex crack growth resistance can be effectively improved. Reducing the protein content and the gel content, in addition to the phospholipid content, further improves these properties.

The modified natural rubber is also excellent in productivity because it is free from contaminants such as pebbles and woodchips and requires no step of removing such contaminants.

Therefore, the rubber composition according to the present invention achieves good fuel economy and high breaking properties at the same time, as well as being excellent in processability and productivity.

The modified natural rubber has a phosphorus content of 200 ppm or less. A phosphorus content of more than 200 ppm tends to cause an increase in tan δ, thereby resulting in poor fuel economy. Such a phosphorus content also tends to cause an increase in the Mooney viscosity of the unvulcanized rubber composition, thereby leading to poor processability. The phosphorus content is preferably 150 ppm or less, and more preferably 100 ppm or less. Here, the phosphorus content can be measured by conventional methods such as ICP optical emission spectrometry. The phosphorus is derived from phospholipids (phosphorus compounds).

The modified natural rubber preferably has a nitrogen content of 0.3% by mass or less, and more preferably 0.15% by mass or less. A nitrogen content of more than 0.3% by mass tends to reduce fuel economy, and to cause an increase in Mooney viscosity during storage, leading to poor processability. The nitrogen content can be determined by conventional methods such as the Kjeldahl method. The nitrogen is derived from proteins.

The modified natural rubber preferably has a gel content of 20% by mass or less, more preferably 10% by mass or less, and still more preferably 7% by mass or less. A gel content of more than 20% by mass tends to result in poor processability and poor fuel economy. The gel content refers to a value that is determined as an amount of matter insoluble in toluene which is a non-polar solvent. Hereinafter, this content is also referred to simply as "gel content" or "gel fraction". The gel content is determined by the following method. First, a natural rubber sample is immersed in dehydrated toluene and then left in a dark place protected from light for one week. Next, the toluene solution is centrifuged for 30 minutes at $1.3 \times 10^5$ rpm so that a toluene-insoluble gel fraction and a toluene-soluble fraction are separated from each other. To the toluene-insoluble gel fraction, methanol is added for solidification, and the resulting solid is then dried. Finally, the gel content can be determined from the ratio of the mass of the dried gel fraction to the mass of the original sample.

The modified natural rubber preferably contains substantially no phospholipid. Here, the phrase "contains substantially no phospholipid" means that no phospholipid peak appears in a range of −3 to 1 ppm in the $^{31}$P-NMR measurement of an extract obtained by chloroform extraction from a natural rubber sample. The phospholipid peak that appears in a range of −3 to 1 ppm refers to a peak derived from a phosphate ester structure in the phosphorus component of phospholipids.

The modified natural rubber can be produced by, for example, the method disclosed in JP 2010-138359 A. A preferred production method includes the following steps of: (A) saponifying natural rubber latex to prepare a saponified natural rubber latex; (B) coagulating the saponified natural rubber latex and treating the resulting coagulated rubber with alkali; and (C) washing the resultant rubber until the phosphorus content in rubber falls to 200 ppm or less. The phosphorus content can be effectively reduced by this method. Since, after the coagulation using acid, the acid remaining in the coagulated rubber is neutralized by the alkali treatment, the rubber is not only prevented from degradation by acid, but the nitrogen content and the like of rubber can also be further reduced. By using the modified natural rubber obtained by the method, the fuel economy, flex crack growth resistance, and processability are remarkably improved and high levels of these properties are obtained.

In the above production method, the saponification can be performed by adding an alkali and optionally a surfactant to natural rubber latex and allowing the mixture to stand for a certain period at a predetermined temperature. Here, the mixture may optionally be stirred or subjected to other operations. The method enables production of natural rubber with reduced contents of phosphorus and nitrogen.

As the natural rubber latex, conventionally known latexes may be used such as raw latex, purified latex, and high ammonia latex. Examples of the alkali used in the saponification include sodium hydroxide, potassium hydroxide, calcium hydroxide, and amine compounds. Among these, sodium hydroxide and potassium hydroxide are particularly preferred. As the surfactant, known anionic, nonionic, or amphoteric surfactants may be used. Among these, anionic surfactants are preferred, and sulphonate anionic surfactants are more preferred.

The addition amount of the alkali in the saponification can be appropriately determined, and is preferably 0.1 to 10 parts by mass per 100 parts by mass of the solids of natural rubber latex. The addition amount of the surfactant is preferably 0.01 to 6.0 parts by mass per 100 parts by mass of the solids of natural rubber latex. Also the temperature and the time period of the saponification can be appropriately determined, and are generally 20° C. to 70° C. and 1 to 72 hours, respectively.

After the saponification, the resulting saponified natural rubber latex is coagulated and the coagulated rubber is then optionally broken up. Subsequently, the coagulated rubber or broken rubber is subjected to alkali treatment by contact with alkali. By the alkali treatment, the nitrogen content and the like of rubber can be effectively reduced and the effects of the present invention are further enhanced. Examples of the coagulation method include a method in which an acid such as formic acid is added to latex. The alkali treatment method is not particularly limited as long as the method is carried out by bringing the rubber into contact with alkali. Examples of the alkali treatment method include a method of immersing the coagulated rubber or broken rubber in an alkali solution. Examples of the alkali that can be used in the alkali treatment include alkali metal carbonates such as potassium carbonate, sodium carbonate, sodium hydrogen carbonate, potassium hydrogen carbonate, lithium carbonate, and lithium hydrogen carbonate, and ammonia water, as well as the alkalis mentioned above for the saponification. In particular, alkali metal carbonates, preferably sodium carbonate and potassium carbonate, are preferred because they highly contribute to the effects of the present invention.

In the case that the alkali treatment is performed by immersion as mentioned above, the treatment may be carried out by immersing the rubber (broken rubber) in an aqueous alkali solution with a concentration of preferably 0.1% to 5% by mass, and more preferably 0.2% to 3% by mass. Such immersion further reduces the nitrogen content and the like of rubber.

In the case that the alkali treatment is performed by the immersion, the temperature during the alkali treatment can be appropriately determined, and is typically preferably 20° C. to 70° C. The time period of the alkali treatment, although it depends on the treatment temperature, is preferably 1 to 20 hours, and more preferably 2 to 12 hours, in terms of sufficient levels of treatment and productivity.

After the alkali treatment, washing treatment is carried out, which leads to reduction of the phosphorus content in rubber. The washing treatment may be carried out by, for example, diluting the rubber component with water for washing, and then centrifuging the mixture, or by leaving the rubber to float, and then draining only the water phase to recover the rubber component. Before the centrifugation, dilution with water is first performed so that the content of the rubber component in natural rubber latex is 5% to 40% by mass, and preferably 10% to 30% by mass. Next, the diluted rubber mixture may be centrifuged for 1 to 60 minutes at 5000 to 10000 rpm, and such washing may be repeated until the phosphorus content falls to a desired value. Also in the case that the rubber is left to float, washing may be carried out by repeating addition of water and stirring until the phosphorus content falls to a desired value. After the completion of washing, the resulting rubber is dried to give a modified natural rubber usable in the present invention.

In the rubber composition of the present invention, the modified natural rubber content in 100% by mass of the rubber component is preferably 5% by mass or more, more preferably 30% by mass or more, and still more preferably 50% by mass or more. A modified natural rubber content of less than 5% by mass may result in insufficient improvement in fuel economy, flex crack growth resistance, and processability. The upper limit of the modified natural rubber content may be 100% by mass, and is preferably 80% by mass or less.

Examples of rubbers that may be contained in the rubber component in the present invention, other than the modified natural rubber, include diene rubbers such as natural rubber (NR), isoprene rubber (IR), butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR). Among these, BR is preferred because it can remarkably improve fuel economy, flex crack growth resistance, and processability.

The BR content in 100% by mass of the rubber component is preferably 5% by mass or more, and more preferably 20% by mass or more, while it is preferably 80% by mass or less, more preferably 70% by mass or less, and still more preferably 50% by mass or less. The BR content in this range leads to excellent fuel economy, flex crack growth resistance, and processability.

The total content of the modified natural rubber and BR in 100% by mass of the rubber component is preferably 80% by mass or more, and more preferably 100% by mass. The total content in this range leads to excellent fuel economy, flex crack growth resistance, and processability.

Examples of the carbon black include, but not particularly limited to, GPF, FEF, HAF, ISAF, and SAF. The use of carbon black leads to reinforcement, and thereby the resulting composition can have favorable flex crack growth resistance. Accordingly, the use of carbon black in combination with the modified natural rubber enables the effects of the present invention to be achieved successfully.

The nitrogen adsorption specific surface area ($N_2SA$) of the carbon black is preferably 20 $m^2/g$ or larger, and more preferably 35 $m^2/g$ or larger. An $N_2SA$ of smaller than 20 $m^2/g$ may result in insufficient reinforcement. The $N_2SA$ of the carbon black is preferably 150 $m^2/g$ or smaller, and more preferably 60 $m^2/g$ or smaller. An $N_2SA$ of larger than 150 $m^2/g$ tends to cause difficulty in dispersing the carbon black, thereby resulting in poor fuel economy.

The $N_2SA$ of carbon black herein is determined by JIS K 6217-2:2001.

In order to achieve excellent breaking properties, the dibutyl phthalate (DBP) oil absorption of the carbon black is preferably 50 ml/100 g or more, and more preferably 100 ml/100 g or more, while it is preferably 150 ml/100 g or less, and more preferably 130 ml/100 g or less.

The DBP oil absorption of carbon black is determined by a measuring method in accordance with JIS K6217-4:2001.

The amount of the carbon black is preferably 10 parts by mass or more, more preferably 20 parts by mass or more, still more preferably 35 parts by mass or more, and particularly preferably 45 parts by mass or more, for each 100 parts by mass of the rubber component. An amount of the carbon black of less than 10 parts by mass may result in insufficient reinforcement. The amount of the carbon black is preferably 100 parts by mass or less, more preferably 90 parts by mass or less, and still more preferably 80 parts by mass or less, for each 100 parts by mass of the rubber component. An amount of the carbon black of more than 100 parts by mass tends to lead to poor fuel economy.

The white filler may be one generally used in the rubber industry, including, for example, silica, calcium carbonate, mica such as sericite, aluminum hydroxide, magnesium oxide, magnesium hydroxide, clay, talc, alumina, and titanium oxide. Preferred among these white fillers is silica in terms of fuel economy and rubber strength.

The silica is not particularly limited. Examples thereof include dry silica (anhydrous silicic acid), and wet silica (hydrous silicic acid). Preferred among these is wet silica (hydrous silicic acid) because such silica contains a large number of silanol groups.

The nitrogen adsorption specific surface area ($N_2SA$) of the silica is preferably 90 $m^2/g$ or larger, and more preferably 100 $m^2/g$ or larger. An $N_2SA$ of smaller than 90 $m^2/g$ tends to result in insufficient reinforcement. The $N_2SA$ of the silica is preferably 250 $m^2/g$ or smaller, more preferably 220 $m^2/g$ or smaller, and still more preferably 120 $m^2/g$ or smaller. An $N_2SA$ of larger than 250 $m^2/g$ tends to cause a decrease in silica dispersibility, and deteriorate processability.

The nitrogen adsorption specific surface area of silica is a value determined by the BET method in accordance with ASTM D3037-81.

The amount of the white filler (preferably silica) is preferably 5 parts by mass or more, and more preferably 40 parts by mass or more, while it is preferably 100 parts by mass or less, and more preferably 60 parts by mass or less, for each 100 parts by mass of the rubber component. The amount of the white filler (preferably silica) in this range leads to favorable fuel economy, flex crack growth resistance, and processability.

The rubber composition of the present invention preferably contains a silane coupling agent when silica is used as the white filler. Examples of the silane coupling agent include sulfide silane coupling agents, mercapto silane coupling agents, vinyl silane coupling agents, amino silane coupling agents, glycidoxy silane coupling agents, nitro silane coupling agents, and chloro silane coupling agents. Preferred among these are sulfide silane coupling agents such as bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide. Particularly preferred is bis(3-triethoxysilylpropyl)disulfide.

In the case that the rubber composition contains a silane coupling agent, the amount of the silane coupling agent is preferably 2 parts by mass or more, and more preferably 4 parts by mass or more, while it is preferably 15 parts by mass or less, and more preferably 12 parts by mass or less, for each 100 parts by mass of the silica. The amount of the silane coupling agent in this range leads to favorable fuel economy, flex crack growth resistance, and processability.

In the rubber composition of the present invention, the total amount of the carbon black and the white filler is preferably 15 parts by mass or more, more preferably 30 parts by mass or more, still more preferably 45 parts by mass or more, and particularly preferably 50 parts by mass or more, for each 100 parts by mass of the rubber component. The total amount is preferably 120 parts by mass or less, more preferably 100 parts by mass or less, and still more preferably 90 parts by mass or less, for each 100 parts by mass of the rubber component. The total amount of the carbon black and the white filler in this range leads to favorable fuel economy, flex crack growth resistance, and processability.

In the present invention, sulfur may preferably be used. The amount of the sulfur is preferably 0.1 parts by mass or more, and more preferably 1 part by mass or more, while it is preferably 10 parts by mass or less, and more preferably 2 parts by mass or less, for each 100 parts by mass of the rubber component. The amount of the sulfur in this range allows the effects of the present invention to be achieved successfully.

In the present invention, an amine antioxidant may be suitably used as an antioxidant because it provides excellent breaking properties. Examples of the amine antioxidant include amine derivatives such as diphenylamines and p-phenylenediamines. Examples of diphenylamine derivatives include p-(p-toluenesulfonylamide)-diphenylamine, and octylated diphenylamine. Examples of p-phenylenediamine derivatives include N-(1,3-dimethylbutyl)-N'-phenyl-p-phenylenediamine (6PPD), N-phenyl-N'-isopropyl-p-phenylenediamine (IPPD), and N,N'-di-2-naphthyl-p-phenylenediamine.

The amount of the antioxidant is preferably 0.5 parts by mass or more, and more preferably 1 part by mass or more, while it is preferably 6 parts by mass or less, and more preferably 4 parts by mass or less, for each 100 parts by mass of the rubber component. The amount of the antioxidant in this range leads to favorable breaking properties.

The rubber composition of the present invention optionally contains compounding ingredients generally used in production of rubber compositions, in addition to the ingredients described above. Examples of the compounding ingredients include stearic acid, zinc oxide, and vulcanization accelerators.

The rubber composition of the present invention can be produced by a usual method. Specifically, for example, the ingredients described above are mixed with an apparatus such as a Banbury mixer, a kneader, or an open roll mill, and then vulcanized, whereby a rubber composition is produced. In the case of producing a rubber composition containing natural rubber, natural rubber is generally masticated before the step of mixing the ingredients including the rubber component and filler. In the present invention, however, it is possible to carry out the mixing step favorably without the mastication, to produce the desired rubber composition because the modified natural rubber is used.

The rubber composition of the present invention is used for a clinch apex. A clinch apex is a component placed at the radially inner end of the sidewall. Clinch apexes are disclosed in FIG. 1 of JP 2008-75066 A, FIG. 1 of JP 2004-106796 A and the like.

The pneumatic tire of the present invention can be produced using the rubber composition mentioned above by a usual method. Specifically, an unvulcanized rubber composition with various additives mixed as necessary is extruded and processed into the shape of a clinch apex, and then arranged and assembled with other tire components by a usual method in a tire building machine to form an unvulcanized tire. This unvulcanized tire is then heated and pressed in a vulcanizer, and thereby a tire is produced.

EXAMPLES

The following will specifically describe the present invention with reference to, but not limited to, examples.

The chemical agents used in Preparations are listed below. The chemical agents were purified by a usual method as necessary.

Natural rubber latex: field latex (available from Muhibbah Lateks Sdn. Bhd.)
Surfactant: Emal-E27C (sodium polyoxyethylene lauryl ether sulfate, produced by Kao Corp.)
NaOH: NaOH (produced by Wako Pure Chemical Industries, Ltd.)
(Production of Saponified Natural Rubber)
Preparation 1

The solids content (DRC) of natural rubber latex was adjusted to 30% (w/v). Next, a 10% Emal-E27 aqueous solution (25 g) and a 40% NaOH aqueous solution (50 g) were added to the natural rubber latex (wet, 1000 g), and saponification reaction was carried out for 48 hours at room temperature. Thus, a saponified natural rubber latex was prepared. The saponified latex was mixed with water for dilution so as to have a DRC of 15% (w/v). Then, while the diluted latex was slowly stirred, formic acid was added thereto to adjust the pH to 4.0, and the latex was coagulated.

The coagulated rubber was broken up and immersed in a 1% sodium carbonate aqueous solution for 5 hours at room temperature. Then, the rubber was removed from the solution and repeatedly washed with 1000 ml of water. Then, the resultant rubber was dried for 4 hours at 90° C. Thus, a solid rubber (saponified natural rubber A) was produced.
Preparation 2

A solid rubber (saponified natural rubber B) was obtained in the same manner as in Preparation 1, except that the addition amount of the 40% NaOH aqueous solution was 25 g.

The solid rubbers (saponified natural rubbers A and B) produced in Preparations 1 and 2 and TSR were measured for nitrogen content, phosphorus content, and gel content by the following methods. Table 1 shows the results.
(Determination of Nitrogen Content)

The nitrogen content was determined with CHN CORDER MT-5 (Yanaco Analytical Instruments). In the determination, first, a calibration curve for determining the nitrogen content was prepared with antipyrine taken as a reference material. Then, about 10 mg of a sample was weighed out and measured three times for nitrogen content. The average of the three measured values was determined as a nitrogen content of the sample.
(Determination of Phosphorus Content)

The phosphorus content of samples was determined with an ICP optical emission spectrometer (ICPS-8100, produced by Shimadzu Corp.).

Also, $^{31}$P-NMR measurement of phosphorus was performed as follows. Chloroform extracts from the raw rubbers were purified and then dissolved in $CDCl_3$ to prepare test samples. The test samples were analyzed with an NMR spectrometer (400 MHz, AV400M, produced by Bruker Japan Co., Ltd.) based on the standard (0 ppm) that was the determined peak of the P atom of an 80% phosphoric acid aqueous solution.
(Determination of Gel Content)

First, a 70.00 mg sample of each raw rubber cut in a size of 1 mm×1 mm was weighed out and mixed with 35 mL of toluene. The mixture was left in a cool and dark place for 1 week. Next, the mixture was centrifuged so that a toluene-insoluble gel fraction was precipitated, and a toluene-soluble supernatant was removed. Then, the gel fraction alone was solidified with methanol and dried. The mass of the dried gel fraction was measured, and the gel content (% by mass) was determined by the following formula. Gel content (% by mass)=[Mass of dried gel fraction (mg)/Mass of original sample (mg)]×100

TABLE 1

|  | Saponified natural rubber A (Preparation 1) | Saponified natural rubber B (Preparation 2) | TSR |
| --- | --- | --- | --- |
| Nitrogen content (% by mass) | 0.12 | 0.25 | 0.33 |
| Phosphorus content (ppm) | 84 | 123 | 572 |
| Gel content (% by mass) | 5.5 | 14.2 | 26.9 |

As shown in Table 1, the saponified natural rubbers A and B, compared with TSR, were found to have reduced contents of nitrogen, phosphorus, and gel fraction.

In addition, in $^{31}$P-NMR measurement of the saponified natural rubbers A and B, no phospholipid peak was observed in a range of −3 ppm to 1 ppm.

In the following, the chemical agents used in Examples and Comparative Examples are listed.

Saponified natural rubber A: see Preparation 1
Saponified natural rubber B: see Preparation 2
NR: TSR20
BR: UBEPOL BR150B (ML$_{1+4}$ (100° C.): 40, cis content: 97% by mass, produced by Ube Industries, Ltd.)
Carbon black: FEF (N550, N$_2$SA: 45 m$^2$/g, DBP oil absorption: 115 ml/100 g, produced by Tokai Carbon Co., Ltd.)
Silica: Silica 115Gr (N$_2$SA: 110 m$^2$/g, produced by Rhodia Japan Ltd.)
Silane coupling agent: Si266 (bis(3-triethoxysilylpropyl) disulfide, produced by Degussa)
Antioxidant: NOCRAC 6C (N-phenyl-N'-(1,3-dimethylbutyl)-p-phenylenediamine (6PPD), produced by Ouchi Shinko Chemical Industrial Co., Ltd.)
Stearic acid: "TSUBAKI" (produced by NOF Corp.)
Zinc oxide: Zinc oxide #1 (produced by Mitsui Mining & Smelting Co., Ltd.)
Sulfur: sulfur powder (produced by Tsurumi Chemical Industry Co., Ltd.)
Vulcanization accelerator A: NOCCELER CZ (N-cyclohexyl-2-benzothiazolylsulfenamide, produced by Ouchi Shinko Chemical Industrial Co., Ltd.)
Vulcanization accelerator B: NOCCELER M (2-mercaptobenzothiazole, produced by Ouchi Shinko Chemical Industrial Co., Ltd.)

Examples and Comparative Examples

In accordance with each formulation shown in Tables 2 to 4, the chemical agents other than the sulfur and vulcanization accelerator(s) were mixed with a 1.7-L Banbury mixer to provide a kneaded mixture. Next, the sulfur and vulcanization accelerator(s) were added to the kneaded mixture, and they were mixed with an open roll mill. Thus, an unvulcanized rubber composition was prepared.

The unvulcanized rubber composition thus prepared was vulcanized for 15 minutes at 170° C., whereby a vulcanized rubber composition was prepared.

It is noted that NR (TSR) was mixed with a peptizer and masticated in advance before use in Comparative Examples 1 to 6. Here, the addition amount of the peptizer was 0.4 parts by mass for each 100 parts by mass of NR (TSR).

The obtained unvulcanized rubber compositions and vulcanized rubber compositions were evaluated in the following ways. The evaluation results are shown in Tables 2 to 4.

(Processability)

The prepared unvulcanized rubber compositions were measured for Mooney viscosity at 130° C. in accordance with the method of determining Mooney viscosity specified in JIS K6300. The Mooney viscosity of each unvulcanized rubber composition was expressed as an index (Mooney viscosity index) by the following equation. The larger the index is, the lower the Mooney viscosity is, and in turn the better the processability is.

(Mooney viscosity index)=(ML$_{1+4}$ of Comparative Example 1,3, or 5)/(ML$_{1+4}$ of each formulation)× 100

(Low Heat Build-Up)

The vulcanized rubber composition of each formulation was measured for loss tangent (tan δ) with a viscoelasticity spectrometer VES (Iwamoto Seisakusho Co., Ltd.) under the following conditions: a temperature of 70° C.; an initial strain of 10%; a dynamic strain of 2%; and a frequency of 10 Hz. The loss tangent (tan δ) of each formulation was expressed as an index (index of low heat build-up) by the following equation. The larger the index is, the better the fuel economy is.

(Index of low heat build-up)=(tan δ of Comparative Example 1,3, or 5)/(tan δ of each formulation)× 100

(Flex Crack Growth Resistance Test)

A test sample was prepared from each vulcanized rubber composition and subjected to a flex crack growth test in accordance with JIS-K-6260 "Testing method of flex cracking and crack growth for rubber, vulcanized or thermoplastic (De Mattia)". In the test, the sample was flexed at 70% elongation repeatedly 1,000,000 times, and then the length of generated cracks was measured. The result of each sample was expressed as an index by the following equation. The larger the index is, the more suppressed the crack growth is, and in turn the higher the flex crack growth resistance is.

(Flex crack growth resistance index)=(Crack length of Comparative Example 1,3, or 5)/(Crack length of each formulation)×100

TABLE 2

| | | Carbon black blend (90 parts by mass) | | | | |
|---|---|---|---|---|---|---|
| | | Comparative Example 1 | Example 1 | Example 2 | Example 3 | Comparative Example 2 |
| Formulation (parts by mass) | Saponified natural rubber A (Preparation 1) | — | 40 | — | 60 | — |
| | Saponified natural rubber B (Preparation 2) | — | — | 40 | — | — |
| | NR | 40 | — | — | — | 60 |
| | BR | 60 | 60 | 60 | 40 | 40 |
| | Carbon black | 90 | 90 | 90 | 90 | 90 |
| | Antioxidant | 1 | 1 | 1 | 1 | 1 |
| | Stearic acid | 2 | 2 | 2 | 2 | 2 |
| | Zinc oxide | 4 | 4 | 4 | 4 | 4 |
| | Sulfur | 1 | 1 | 1 | 1 | 1 |
| | Vulcanization accelerator A | 1.5 | 1.5 | 1.5 | 1.5 | 1.5 |
| Evaluation | Mooney viscosity (index) | 100 | 112 | 110 | 118 | 85 |
| | Low heat build-up (tanδ) (index) | 100 | 117 | 114 | 123 | 102 |

TABLE 2-continued

Carbon black blend (90 parts by mass)

|  |  | Comparative Example 1 | Example 1 | Example 2 | Example 3 | Comparative Example 2 |
|---|---|---|---|---|---|---|
|  | Flex crack growth resistance (index) | 100 | 107 | 109 | 100 | 107 |

TABLE 3

Carbon black blend (20 parts by mass)

|  |  | Comparative Example 3 | Example 4 | Example 5 | Example 6 | Comparative Example 4 |
|---|---|---|---|---|---|---|
| Formulation (parts by mass) | Saponified natural rubber A (Preparation 1) | — | 40 | — | 60 | — |
|  | Saponified natural rubber B (Preparation 2) | — | — | 40 | — | — |
|  | NR | 40 | — | — | — | 60 |
|  | BR | 60 | 60 | 60 | 40 | 40 |
|  | Carbon black | 20 | 20 | 20 | 20 | 20 |
|  | Antioxidant | 1 | 1 | 1 | 1 | 1 |
|  | Stearic acid | 2 | 2 | 2 | 2 | 2 |
|  | Zinc oxide | 4 | 4 | 4 | 4 | 4 |
|  | Sulfur | 1 | 1 | 1 | 1 | 1 |
|  | Vulcanization accelerator A | 1.5 | 1.5 | 1.5 | 1.5 | 1.5 |
| Evaluation | Mooney viscosity (index) | 100 | 113 | 111 | 120 | 95 |
|  | Low heat build-up (tanδ) (index) | 100 | 120 | 118 | 129 | 103 |
|  | Flex crack growth resistance (index) | 100 | 105 | 111 | 121 | 110 |

TABLE 4

Silica blend

|  |  | Comparative Example 5 | Example 7 | Example 8 | Example 9 | Comparative Example 6 |
|---|---|---|---|---|---|---|
| Formulation (parts by mass) | Saponified natural rubber A (Preparation 1) | — | 40 | — | 60 | — |
|  | Saponified natural rubber B (Preparation 2) | — | — | 40 | — | — |
|  | NR | 40 | — | — | — | 60 |
|  | BR | 60 | 60 | 60 | 40 | 40 |
|  | Silica | 50 | 50 | 50 | 50 | 50 |
|  | Silane coupling agent | 4 | 4 | 4 | 4 | 4 |
|  | Antioxidant | 1 | 1 | 1 | 1 | 1 |
|  | Stearic acid | 2 | 2 | 2 | 2 | 2 |
|  | Zinc oxide | 4 | 4 | 4 | 4 | 4 |
|  | Sulfur | 1 | 1 | 1 | 1 | 1 |
|  | Vulcanization accelerator A | 0.5 | 0.5 | 0.5 | 0.5 | 0.5 |
|  | Vulcanization accelerator B | 1 | 1 | 1 | 1 | 1 |
| Evaluation | Mooney viscosity (index) | 100 | 117 | 113 | 127 | 94 |
|  | Low heat build-up (tanδ) (index) | 100 | 122 | 120 | 131 | 101 |
|  | Flex crack growth resistance (index) | 100 | 109 | 110 | 110 | 108 |

As shown in Tables 2 to 4, in all the carbon black blends (90 parts by mass, 20 parts by mass) and silica blends of Examples in which a modified natural rubber having a phosphorus content of 200 ppm or less (saponified natural rubber A or B) was used, the processability, fuel economy, and flex crack growth resistance were improved in a balanced manner, compared with Comparative Examples. Especially, in the Examples in which a modified natural rubber having a lower content of phosphorus (saponified natural rubber A) was used, excellent processability and fuel economy were demonstrated.

The invention claimed is:
1. A pneumatic tire, comprising a clinch apex produced from a rubber composition, comprising:
   a rubber component containing a modified natural rubber having a phosphorus content of 200 ppm or less; and
   at least one of carbon black and a white filler.

2. The pneumatic tire according to claim 1,
wherein the rubber composition comprises 5% by mass or more of the modified natural rubber based on 100% by mass of the rubber component.

3. The pneumatic tire according to claim 1,
wherein the modified natural rubber has a nitrogen content of 0.3% by mass or less and a gel content of 20% by mass or less, the gel content being determined as an amount of matter insoluble in toluene.

4. The pneumatic tire ccording to claim 1,
wherein the modified natural rubber is produced by saponifying natural rubber latex.

5. The pneumatic tire according to claim 1,
wherein the modified natural rubber is produced by the steps of: (A) saponifying natural rubber latex to prepare a saponified natural rubber latex; (B) coagulating the saponified natural rubber latex and treating the resulting coagulated rubber with alkali; and (C) washing the resultant rubber until the phosphorus content in rubber falls to 200 ppm or less.

6. The pneumatic tire according to claim 1,
wherein the white filler is silica.

\* \* \* \* \*